(12) United States Patent
Takayama et al.

(10) Patent No.: US 11,168,402 B2
(45) Date of Patent: Nov. 9, 2021

(54) METAL CORROSION INHIBITOR

(71) Applicant: NIPPON SHOKUBAI CO., LTD., Osaka (JP)

(72) Inventors: Takeshi Takayama, Osaka (JP); Masashi Tonoya, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 16/638,690

(22) PCT Filed: Feb. 18, 2019

(86) PCT No.: PCT/JP2019/005750
§ 371 (c)(1),
(2) Date: Feb. 12, 2020

(87) PCT Pub. No.: WO2019/160131
PCT Pub. Date: Aug. 22, 2019

(65) Prior Publication Data
US 2021/0156035 A1    May 27, 2021

(30) Foreign Application Priority Data

Feb. 16, 2018   (JP) .............................. JP2018-026093

(51) Int. Cl.
*C23F 11/12* (2006.01)
*C23F 11/16* (2006.01)

(52) U.S. Cl.
CPC .......... *C23F 11/161* (2013.01); *C23F 11/126* (2013.01); *C23F 11/128* (2013.01)

(58) Field of Classification Search
CPC ....... C23F 11/12; C23F 11/124; C23F 11/126; C23F 11/128; C23F 11/16; C23F 11/161; C23F 11/04; C23F 11/173; C08K 5/37; C08K 5/372; C09K 15/10; C09K 15/12; C07C 321/04; C07C 321/08; C07C 321/14; C07C 321/18; C07C 323/50; C07C 323/51; C07C 323/52; C07C 323/54
USPC ..................... 252/182.29, 395, 396
See application file for complete search history.

(56) References Cited

U.S. PATENT DOCUMENTS

| | | | | |
|---|---|---|---|---|
| 3,755,176 A | * | 8/1973 | Kinney .................. | C23F 11/16 252/395 |
| 5,013,482 A | * | 5/1991 | O'Neil ................. | C07C 59/125 252/395 |
| 9,212,094 B2 | * | 12/2015 | Kawakami ............... | C04B 28/02 |
| 2010/0234592 A1 | * | 9/2010 | Leinweber ............ | C23F 11/145 544/110 |
| 2013/0184420 A1 | * | 7/2013 | Kawabata .......... | C08G 65/2609 526/75 |
| 2018/0371264 A1 | * | 12/2018 | Hatton .................... | C23F 11/16 |

FOREIGN PATENT DOCUMENTS

| | | | |
|---|---|---|---|
| CN | 103119074 | 5/2013 | |
| EP | 1 103 570 | 5/2001 | |
| EP | 2 277 932 | 1/2011 | |
| JP | 2001-316857 | 11/2001 | |
| JP | 2004339611 A | * 12/2004 | |
| JP | 2006-183079 | 7/2006 | |
| JP | 2010-070805 | 4/2010 | |
| JP | 2014218618 A | * 11/2014 | |
| JP | 2014218619 A | * 11/2014 | |
| JP | 2016-060932 | 4/2016 | |
| JP | 2016060932 A | * 4/2016 | |
| JP | 2017-165854 | 9/2017 | |
| WO | 00/66810 | 11/2000 | |
| WO | WO-2014010572 A1 | * 1/2014 | .......... C08F 290/062 |
| WO | 2016/200767 | 12/2016 | |

OTHER PUBLICATIONS

English language machine translation of Kimura et al. (JP 2004-339611 A) (Year: 2004).*
English language machine translation of Shinokura et al. (JP 2014-218618 A) (Year: 2014).*
English language machine translation of Shinokura et al. (JP 2014-218619 A) (Year: 2014).*

* cited by examiner

*Primary Examiner* — Matthew R Diaz
(74) *Attorney, Agent, or Firm* — Hamre, Schumann, Mueller & Larson, P.C.

(57) ABSTRACT

The present invention provides a novel metal corrosion inhibitor containing a compound having a specific structure. The present invention relates to a metal corrosion inhibitor including a compound (X) including one molecule of a mercaptocarboxylic acid or a mercaptocarboxylic acid salt; one molecule of acrylic acid, an acrylic acid salt, or an acrylic acid ester; and one molecule of a monomer (B) represented by the following formula (1), which are bonded to each other:

[Chem. 1]

$$\underset{R^2}{\overset{R^1}{>}}=\underset{(CH_2)_x}{\overset{R^3}{<}}-O-(AO)_n-R^4. \tag{1}$$

10 Claims, No Drawings

METAL CORROSION INHIBITOR

TECHNICAL FIELD

The present invention relates to metal corrosion inhibitors. The present invention specifically relates to a metal corrosion inhibitor useful for metal articles such as containers and pipes for compositions containing a polycarboxylic acid polymer, for example.

BACKGROUND ART

Polycarboxylic acid aqueous solutions or the like are known to cause corrosion of metal containers and metal pipes. For such a problem, techniques for preventing metal corrosion have been developed.

For example, Patent Literature 1 discloses a metal corrosion inhibitor for a polycarboxylic acid aqueous solution, containing a sulfur atom in its molecule.

Patent Literature 2 discloses a method for storing a copolymer composition containing a copolymer including a constitutional unit (I) derived from an unsaturated polyalkylene glycol ether-based monomer (a) represented by a specific structure in an amount of 50 wt % to 99 wt %, a constitutional unit (II) derived from an unsaturated monocarboxylic acid-based monomer (b) represented by the formula (2) in an amount of 1 wt % to 50 wt %, and/or a constitutional unit (III) derived from a monomer (c) copolymerizable with the monomer (a) and/or the monomer (b) in an amount of 0 wt % to 49 wt %, where the total of the constitutional unit (I), the constitutional unit (II), and the constitutional unit (III) is 100 wt %, the copolymer composition including a compound having a —S—S-bond in an amount within the range of 0.0001 wt % to 0.02 wt %.

CITATION LIST

Patent Literature

Patent Literature 1: JP 2016-60932 A
Patent Literature 2: JP 2017-165854 A

SUMMARY OF INVENTION

Technical Problem

Although various techniques for metal corrosion inhibition have been conventionally developed as described above, Patent Literature 1, which discloses, a metal corrosion inhibitor containing a sulfur atom in its molecule, does not describe specific compounds other than compounds having at least one selected from a —SH group and a —S—S— bond at all, and Patent Literature 2 does not disclose compounds used as a metal corrosion inhibitor, other than compounds having a —S—S— bond, at all. Thus, metal corrosion inhibitors need to be further developed.

The present invention has been made in view of the state of the art and aims to provide a novel metal corrosion inhibitor containing a compound having a specific structure.

Solution to Problem

The present inventors conducted various studies on a metal corrosion inhibiting substance and have found that a compound including one molecule of a mercaptocarboxylic acid or a mercaptocarboxylic acid salt; one molecule of acrylic acid, an acrylic acid salt, or an acrylic acid ester; and one molecule of a polyalkylene glycol-containing monomer having a specific structure, which are bonded to each other, is excellently effective to inhibit metal corrosion. Thus, they arrived at an admirable solution to the problem, completing the present invention.

That is, one aspect of the present invention relates to a metal corrosion inhibitor including:

a compound (X) including one molecule of a mercaptocarboxylic acid or a mercaptocarboxylic acid salt; one molecule of acrylic acid, an acrylic acid salt, or an acrylic acid ester; and one molecule of a monomer (B) represented by the following formula (1), which are bonded to each other:

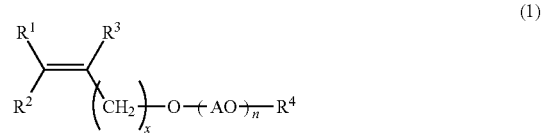

wherein $R^1$, $R^2$, and $R^3$ are the same as or different from each other and are each a hydrogen atom or a methyl group; $R^4$ is a hydrogen atom or a C1-C30 hydrocarbon group; (AO)s are the same as or different from each other and are each an oxyalkylene group; n is an average number of moles of the oxyalkylene group added and is 1 to 300; and x is 0 to 4.

Another aspect of the present invention relates to a composition including:

a carboxyl group-containing polymer; and a compound (X) including one molecule of a mercaptocarboxylic acid or a mercaptocarboxylic acid salt; one molecule of acrylic acid, an acrylic acid salt, or an acrylic acid ester; and one molecule of a monomer (B) represented by the following formula (1), which are bonded to each other:

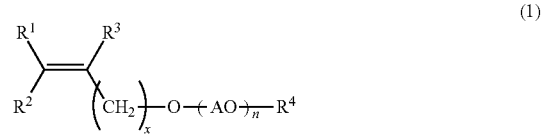

wherein $R^1$, $R^2$, and $R^3$ are the same as or different from each other and are each a hydrogen atom or a methyl group; $R^4$ is a hydrogen atom or a C1-C30 hydrocarbon group; (AO)s are the same as or different from each other and are each an oxyalkylene group; n is an average number of moles of the oxyalkylene group added and is 1 to 300; and x is 0 to 4, the compound (X) being present in an amount of 0.01 to 5 mass % relative to 100 mass % of the carboxyl group-containing polymer.

Yet another aspect of the present invention relates to a method for storing and/or transporting a carboxyl group-containing polymer, the method including placing a compound (X) in a container for storage and/or transport at a concentration of 50 to 30000 ppm, the compound (X) including one molecule of a mercaptocarboxylic acid or a mercaptocarboxylic acid salt; one molecule of acrylic acid, an acrylic acid salt, or an acrylic acid ester; and one molecule of a monomer (B) represented by the following formula (1), which are bonded to each other:

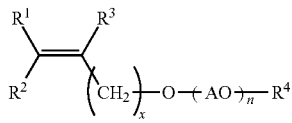

(1)

wherein $R^1$, $R^2$, and $R^3$ are the same as or different from each other and are each a hydrogen atom or a methyl group; $R^4$ is a hydrogen atom or a C1-C30 hydrocarbon group; (AO) s are the same as or different from each other and are each an oxyalkylene group; n is an average number of moles of the oxyalkylene group added and is 1 to 300; and x is 0 to 4.

Still yet another aspect of the present invention relates to a method for using as a metal corrosion inhibitor a composition containing a compound (X) including one molecule of a mercaptocarboxylic acid or a mercaptocarboxylic acid salt; one molecule of acrylic acid, an acrylic acid salt, or an acrylic acid ester; and one molecule of a monomer (B) represented by the following formula (1), which are bonded to each other:

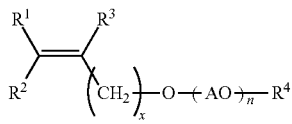

(1)

wherein $R^1$, $R^2$, and $R^3$ are the same as or different from each other and are each a hydrogen atom or a methyl group; $R^4$ is a hydrogen atom or a C1-C30 hydrocarbon group; (AO) s are the same as or different from each other and are each an oxyalkylene group; n is an average number of moles of the oxyalkylene group added and is 1 to 300; and x is 0 to 4.

Advantageous Effects of Invention

Since the metal corrosion inhibitor of the present invention has the above structure and contains the compound (X) with excellent metal corrosion inhibition performance, it is suitable for metal articles such as containers and pipes.

DESCRIPTION OF EMBODIMENTS

The following description is offered to specifically illustrate preferred embodiments of the present invention. It should be noted that the present invention is not limited only to these embodiments, and the embodiments can be appropriately altered within the scope of the present invention. Any combination of two or more of the following preferred embodiments of the present invention is also a preferred embodiment of the present invention.
(Metal Corrosion Inhibitor)
<Compound (X)>

The metal corrosion inhibitor of the present invention contains a compound (X) including one molecule of a mercaptocarboxylic acid or a mercaptocarboxylic acid salt; one molecule of acrylic acid, an acrylic acid salt, or an acrylic acid ester; and one molecule of a monomer (B) represented by the formula (1), which are bonded to each other.

The compound (X) may be any compound containing one molecule each of the above three components, and the molecules may be bonded through any bonding form and may be bonded in any order. The compound (X) is preferably a compound obtained by reacting an addition reaction product of the monomer (B) and acrylic acid, an acrylic acid salt, or an acrylic acid ester with the thiol group of a mercaptocarboxylic acid or a mercaptocarboxylic acid salt. The compound (X) is more preferably a compound represented by the following formula (2):

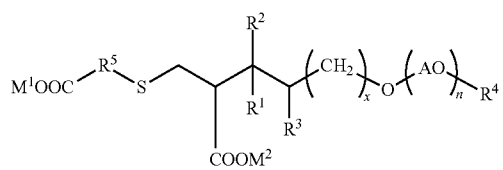

(2)

wherein $R^1$, $R^2$, and $R^3$ are the same as or different from each other and are each a hydrogen atom or a methyl group; $R^4$ is a hydrogen atom or a C1-C30 hydrocarbon group; (AO) s are the same as or different from each other and are each an oxyalkylene group; n is an average number of moles of the oxyalkylene group added and is 1 to 300; x is 0 to 4; $R^5$ is a C1-C4 divalent hydrocarbon group; $M^1$ is a hydrogen atom, a metal atom, an ammonium group, a quaternary ammonium group, or an organic amine group; $M^2$ is a hydrogen atom, a metal atom, an ammonium group, a quaternary ammonium group, an organic amine group, or a C1-C30 hydrocarbon group.

Examples of the metal atom for $M^1$ and $M^2$ include alkali metal atoms such as sodium and potassium and alkaline-earth metal atoms such as magnesium and calcium.

Examples of the organic amine group include alkanolamine groups such as ethanolamine, diethanolamine, and triethanolamine groups and a triethylamine group.

Examples of the C1-C30 hydrocarbon group for $M^2$ include the below-described examples of the C1-C30 hydrocarbon group for $R^4$.

$M^1$ and $M^2$ are each preferably a hydrogen atom.

Preferred embodiments of $R^1$ to $R^5$, n, and x will be described later in the descriptions of the monomer (B), the mercaptocarboxylic acid, and the mercaptocarboxylic acid salt.

The metal corrosion inhibitor of the present invention may contain any proportion of the compound (X). It preferably contains the compound (X) in a proportion of 1 to 80 mass % based on 100 mass % of the metal corrosion inhibitor. This achieves an enhanced metal corrosion inhibiting effect. The proportion is more preferably 3 to 60 mass %, still more preferably 4 to 50 mass %, particularly preferably 5 to 40 mass %.

The concentration of the compound (X) in the metal corrosion inhibitor is preferably higher in terms of its corrosion inhibition performance, but in order to obtain a high concentration of the compound (X), it is necessary to introduce a purification step after the production step of the compound (X) described below. The concentration of the compound (X) is preferably 80 mass % or less in terms of the number of steps.

The metal corrosion inhibitor of the present invention may further contain a different component other than the compound (X).

Non-limiting examples of the different component include a residual polymerization initiator, by-products, and unreacted substances during the production of the compound (X), and moisture. The metal corrosion inhibitor may contain one or more of these.

The term "a mercaptocarboxylic acid or a mercaptocarboxylic acid salt" refers to a mercaptocarboxylic acid or a salt thereof, and may be anyone containing a mercapto group (thiol group) and a carboxyl group. It is preferably a compound represented by the following formula (3):

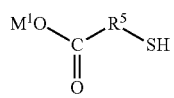

(3)

wherein $R^5$ is an optionally substituted C1-C6 divalent hydrocarbon group; and $M^1$ is a hydrogen atom, a metal atom, an ammonium group, an organic ammonium group, or an organic amine group.

Specific examples of $M^1$ are those described above.

$M^1$ is preferably a hydrogen atom.

The divalent hydrocarbon group for $R^5$ is preferably, but not limited to, an alkylene group obtained by abstracting two hydrogen atoms from a C1-C6 alkane.

Examples of the C1-C6 alkane include C1-C6 linear or branched alkanes such as methane, ethane, propane, n-butane, isobutane, n-pentane, isopentane, n-hexane, and isohexane.

The number of carbon atoms of the alkylene group (alkane) is preferably 1 to 5, more preferably 1 to 4, still more preferably 1 to 3, most preferably 2.

Examples of the alkylene group include methylene, methyl methylene, ethylene, n-propylene, isopropylene, n-butylene, isobutylene, sec-butylene, tert-butylene, n-pentylene, isopentylene, and neopentylene groups. Preferred among these are methylene, methyl methylene, ethylene, and n-propylene groups, with an ethylene group being still more preferred.

The optionally substituted divalent hydrocarbon group may contain any substituent, and examples of the substituent include hydroxy, carboxyl, and sulfonic acid groups. The number of carbon atoms of the divalent hydrocarbon group excludes the number of carbons of the substituent.

The divalent hydrocarbon group is preferably an alkylene group containing no substituent.

Specific examples of the mercaptocarboxylic acid and the mercaptocarboxylic acid salt include thioglycolic acid (mercaptoacetic acid), 3-mercaptopropionic acid, 2-mercaptopropionic acid (thiolactic acid), 4-mercaptobutanoic acid, thiomalic acid, and salts thereof. One or more of these may be used. In particular, in terms of weak odor and economic efficiency, 3-mercaptopropionic acid and salts thereof are preferred, with 3-mercaptopropionic acid being more preferred.

The term "acrylic acid, an acrylic acid salt, or an acrylic acid ester" refers to acrylic acid, a salt thereof, or an acrylic acid ester.

Non-limiting examples of the salt include a metal salt, an ammonium salt, a quaternary ammonium salt, and an organic amine salt.

The acrylic acid ester may be any ester of acrylic acid and an alcohol. The alcohol preferably contains a C1-C30 hydrocarbon group. Examples of the C1-C30 hydrocarbon group include the below-described examples of the C1-C30 hydrocarbon group for $R^4$.

The term "acrylic acid, an acrylic acid salt, or an acrylic acid ester" is preferably an acrylic acid or an acrylic acid salt, more preferably acrylic acid.

In the formula (1) for the monomer (B), $R^1$, $R^2$, and $R^3$ are the same as or different from each other, and are each a hydrogen atom or a methyl group. $R^1$ and $R^2$ are each preferably a hydrogen atom. $R^3$ is preferably a methyl group.

In the formula (1), x is 0 to 4, preferably 0 to 3, more preferably 1 or 2.

In the formula (1), $R^4$ is a hydrogen atom or a C1-C30 hydrocarbon group. Examples of the C1-C30 hydrocarbon group include C1-C30 aliphatic alkyl, C3-C30 alicyclic alkyl, C2-C30 alkenyl, C2-C30 alkynyl, and C6-C30 aryl groups.

Examples of the aliphatic or alicyclic alkyl group include methyl, ethyl, n-propyl, n-butyl, n-pentyl (amyl), n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosanyl, i-propyl, sec-butyl, i-butyl, t-butyl, 1-methylbutyl, 1-ethylpropyl, 2-methylbutyl, i-amyl, neopentyl, 1,2-dimethylpropyl, 1,1-dimethylpropyl, t-amyl, 1,3-dimethylbutyl, 3,3-dimethylbutyl, 2-ethylbutyl, 2-ethyl-2-methylpropyl, 1-methylheptyl, 2-ethylhexyl, 1,5-dimethylhexyl, t-octyl, branched nonyl, decyl, dodecyl, stearyl, icosyl, cyclopropyl, cyclopropylmethyl, cyclobutyl, cyclobutylmethyl, cyclopentyl, cyclohexyl, cyclohexylmethyl, cycloheptyl, cyclooctyl, cyclohexylpropyl, cyclododecyl, norbornyl (C7), adamantyl (C10), and cyclopentylethyl groups.

The number of carbon atoms of the C1-C30 alkyl group is preferably 1 to 22, more preferably 1 to 18, still more preferably 1 to 12, further preferably 1 to 8, particularly preferably 1 to 4.

Examples of the alkenyl group include vinyl, allyl, 1-butenyl, 2-butenyl, pentenyl, hexenyl, heptenyl, octenyl, nonenyl, decenyl, dodecenyl, octadecenyl, and icocenyl groups.

Examples of the alkynyl group include ethynyl, 1-propynyl, 2-propynyl, butynyl, pentynyl, hexynyl, heptynyl, octynyl, nonynyl, decynyl, dodecynyl, octadecynyl, and icosynyl groups.

The number of carbon atoms of each of the C2-C30 alkenyl group and the C2-C30 alkynyl group is preferably 2 to 22, more preferably 2 to 18, still more preferably 2 to 12, further preferably 2 to 8, particularly preferably 2 to 4.

Examples of the C6-C30 aryl group include a phenyl group; a naphthyl group; and aralkyl groups such as benzyl, 1-phenylethyl, 2-phenylethyl, 3-phenylpropyl, 4-phenylbutyl, styryl (Ph-CH=C—), cinnamyl (Ph-CH=CHCH$_2$—), 1-benzocyclobutenyl, and 1,2,3,4-tetrahydronaphthyl groups. The number of carbon atoms of the C6-C30 aryl group is preferably 6 to 20, more preferably 6 to 10.

In the formula (1), $R^4$ is preferably a hydrogen atom or a C1-C30 alkyl group, more preferably a hydrogen atom.

In the formula (1), AOs "are the same as or different from each other" and are each an oxyalkylene group. This means that all n oxyalkylene groups (AOs) in the polyalkylene glycol may be the same as or different from each other.

In the formula (1), the oxyalkylene group represented by AO is prepared by adding an alkylene oxide. Examples of the alkylene oxide thereof include C2-C8 alkylene oxides such as ethylene oxide, propylene oxide, butylene oxide, isobutylene oxide, 1-butene oxide, 2-butene oxide, and styrene oxide. Preferred are C2-C4 alkylene oxides such as ethylene oxide, propylene oxide, and butylene oxide, and more preferred are ethylene oxide and propylene oxide.

When the polyalkylene glycol is an alkylene oxide adduct including any two or more oxides selected from ethylene oxide, propylene oxide, butylene oxide, styrene oxide, and the like, the oxides may be added by any addition form such as random addition, block addition, or alternating addition. In order to achieve a balance of hydrophilicity and hydrophobicity, the oxyalkylene groups in the polyalkylene glycol preferably essentially include oxyethylene groups. More preferably, the oxyethylene groups constitute 50 mol % or more of the oxyalkylene groups, still more preferably constitute 90 mol % or more of the oxyalkylene groups.

In the formula (1), n is the average number of moles of the oxyalkylene group added, and n is 1 to 300, preferably 2 or more, more preferably 5 or more, still more preferably 10 or more, particularly preferably 15 or more, most preferably 20 or more, and n is preferably 250 or less. Further, n is preferably in the range of 2 to 300, more preferably 5 to 300, still more preferably 10 to 250, particularly preferably 15 to 250, further preferably 20 to 200.

Examples of the monomer (B) include compounds in which 1 to 300 mol of an alkylene oxide is added to a C2-C8 unsaturated alcohol such as vinyl alcohol, allyl alcohol, methallyl alcohol (2-methyl-allyl alcohol), 3-methyl-3-buten-1-ol, 3-methyl-2-buten-1-ol, 2-methyl-3-buten-1-ol, or 2-methyl-2-buten-1-ol and terminally hydrophobically-modified products of these.

Specific examples thereof include polyethylene glycol mono(3-methyl-3-butenyl)ether, polyethylene glycol mono (3-methyl-2-butenyl)ether, polyethylene glycol mono(2-methyl-3-butenyl)ether, polyethylene glycol mono(2-methyl-2-butenyl)ether, polyethylene glycol mono(1,1-dimethyl-2-propenyl)ether, polyethylene polypropylene glycol mono(3-methyl-3-butenyl)ether, polyethylene glycol mono(2-methyl-2-propenyl)ether, polyethylene polypropylene glycol mono(2-methyl-2-propenyl)ether; methoxypolyethylene glycol mono(3-methyl-3-butenyl)ether, ethoxypolyethylene glycol mono(3-methyl-3-butenyl)ether, 1-propoxypolyethylene glycol mono(3-methyl-3-butenyl) ether, cyclohexyloxypolyethylene glycol mono(3-methyl-3-butenyl) ether, 1-octyloxypolyethylene glycol mono(3-methyl-3-butenyl)ether, nonylalkoxypolyethylene glycol mono(3-methyl-3-butenyl) ether, laurylalkoxypolyethylene glycol mono(3-methyl-3-butenyl)ether, stearylalkoxypolyethylene glycol mono(3-methyl-3-butenyl)ether, phenoxypolyethylene glycol mono(3-methyl-3-butenyl)ether, naphthoxypolyethylene glycol mono(3-methyl-3-butenyl)ether, methoxypolyethylene glycol mono(2-methyl-2-propenyl) ether, ethoxypolyethylene glycol mono(2-methyl-2-propenyl) ether, 1-propoxypolyethylene glycol mono(2-methyl-2-propenyl)ether, cyclohexyloxypolyethylene glycol mono(2-methyl-2-propenyl)ether, 1-octyloxypolyethylene glycol mono(2-methyl-2-propenyl)ether, nonylalkoxypolyethylene glycol mono(2-methyl-2-propenyl)ether, laurylalkoxypolyethylene glycol mono(2-methyl-2-propenyl)ether, stearylalkoxypolyethylene glycol mono(2-methyl-2-propenyl)ether, phenoxypolyethylene glycol mono(2-methyl-2-propenyl) ether, and naphthoxypolyethylene glycol mono(2-methyl-2-propenyl)ether.

Preferred among these are compounds prepared by adding an alkylene oxide to methallyl alcohol or 3-methyl-3-buten-1-ol, and more preferred are polyethylene glycol mono(3-methyl-3-butenyl) ether and polyethylene glycol mono(2-methyl-2-propenyl) ether.

<Method for Producing Compound (X)>

The compound (X) may be produced by any method that can provide the compound (X) including one molecule of a mercaptocarboxylic acid or a mercaptocarboxylic acid salt; one molecule of acrylic acid, an acrylic acid salt, or an acrylic acid ester; and one molecule of a monomer (B) represented by the formula (1), which are bonded to each other. The compound (X) can be synthesized by mixing at least one selected from the group consisting of a mercaptocarboxylic acid and a mercaptocarboxylic acid salt; at least one selected from the group consisting of acrylic acid, an acrylic acid salt, and an acrylic acid ester; and a monomer (B) represented by the formula (1). The reaction may be conducted in the presence of a radical polymerization initiator as needed.

The ratio by mass of the at least one selected from the group consisting of a mercaptocarboxylic acid and a mercaptocarboxylic acid salt to the at least one selected from the group consisting of acrylic acid, an acrylic acid salt, and an acrylic acid ester to the monomer (B) is preferably (0.5 to 15)/(0.5 to 15)/(70 to 99), more preferably (1.0 to 10)/(1.0 to 10)/(80 to 98), still more preferably (1.5 to 5)/(1.5 to 5)/(90 to 97).

The composition preferably contains the at least one selected from the group consisting of a mercaptocarboxylic acid and a mercaptocarboxylic acid salt in an amount of 5 to 50 mol relative to the total 100 mol of the monomer (B) and the at least one selected from the group consisting of acrylic acid, an acrylic acid salt, and an acrylic acid ester. This can lead to a reaction product containing the compound (X) in an amount within a suitable range. The amount is more preferably 10 to 45 mol, still more preferably 20 to 35 mol.

The radical polymerization initiator may be any one that can generate radicals. For a reaction in an aqueous solution, the radical polymerization initiator may be a water-soluble polymerization initiator. Examples thereof include persulfates such as ammonium persulfate, sodium persulfate, and potassium persulfate; hydrogen peroxide; and water-soluble azo initiators such as an azoamidine compound (e.g., 2,2'-azobis-2-methylpropionamidine hydrochloride), a cyclic azoamidine compound (e.g., 2,2'-azobis-2-(2-imidazolin-2-yl) propane hydrochloride, and an azonitrile compound (e.g., 2-carbamoylazoisobutyronitrile). In this case, an accelerator may be used in combination with the radical polymerization initiator. Examples of the accelerator include alkali metal sulfites such as sodium bisulfite, metadisulfite, sodium hypophosphite, Fe(II) salts such as Mohr's salt, sodium hydroxymethanesulfinate dihydrate, hydroxylamine hydrochlorides, thiourea, L-ascorbic acid (and salts thereof), and erythorbic acid (and salts thereof). Preferred among these are hydrogen peroxide and persulfates such as ammonium persulfate, sodium persulfate, and potassium persulfate. A combination of a persulfate or hydrogen peroxide with an accelerator such as L-ascorbic acid (or a salt thereof) is also preferred. These radical polymerization initiators or these accelerators may be used alone or in combination of two or more thereof.

When the reaction is conducted in the presence of a solvent such as a lower alcohol, an aromatic or aliphatic hydrocarbon, an ester compound, or a ketone compound or in the absence of a solvent, a peroxide such as benzoyl peroxide, lauroyl peroxide, or sodium peroxide; a hydroperoxide such as t-butyl hydroperoxide or cumene hydroperoxide; or an azo compound such as azobisisobutyronitrile is preferably used. In this case, an accelerator such as an amine compound may be used in combination with the radical polymerization initiator. Further, in the case of a water-lower alcohol solvent mixture, an appropriate radical polymerization initiator or an appropriate combination of a radical polymerization initiator and an accelerator selected from those described above may be used.

The amount of the radical polymerization initiator, when used, is preferably 20 mol or less, more preferably 10 mol or less, particularly preferably 5 mol or less, most preferably 3 mol or less relative to the total 100 mol of the monomer (B) and the at least one selected from the group consisting of acrylic acid, an acrylic acid salt, and an acrylic acid ester.

The reaction temperature of the reaction is preferably 0° C. or higher and preferably 150° C. or lower. The reaction temperature is more preferably 10° C. or higher, still more preferably 15° C. or higher. The reaction temperature is more preferably 100° C. or lower, still more preferably 90° C. or lower.

The at least one selected from the group consisting of a mercaptocarboxylic acid and a mercaptocarboxylic acid salt, the at least one selected from the group consisting of acrylic acid, an acrylic acid salt, and an acrylic acid ester, and the monomer (B) may be placed into a reaction vessel by any method such as a method of placing each of the whole amounts of these into the reaction vessel in one portion at the beginning of the reaction; a method of placing each of the whole amounts of these into the reaction vessel in portions or in a continuous manner; or a method of placing part of these into the reaction vessel at the beginning of the reaction, and then placing the rest of these into the reaction vessel in portions or in a continuous manner. The radical polymerization initiator, when used, may be initially placed into the reaction vessel, may be added dropwise into the reaction vessel, or may be placed into the reaction vessel by combination of these depending on the purpose.

The compound (X) obtained through the reaction can be identified with a high-performance liquid chromatography (HPLC) apparatus and a liquid chromatography mass spectrometer (LC-MS).

The metal corrosion inhibitor of the present invention is preferably added to a composition when the composition is reacted, stored, or transported using a metal container or the like.

The composition is preferably, but not limited to, a composition containing the carboxyl group-containing polymer described below or a raw material of the carboxyl group-containing polymer.

The concentration of the metal corrosion inhibitor of the present invention in the composition is preferably 100 to 100000 ppm, more preferably 500 to 50000 ppm, still more preferably 1000 to 40000 ppm, particularly preferably 2000 to 30000 ppm.

The concentration of the metal corrosion inhibitor in the composition may be determined by the method described in the EXAMPLES.

The present invention also relates to a method for using as a metal corrosion inhibitor a compound (X) including one molecule of a mercaptocarboxylic acid or a mercaptocarboxylic acid salt; one molecule of acrylic acid, an acrylic acid salt, or an acrylic acid ester; and one molecule of a monomer (B) represented by the following formula (1), which are bonded to each other:

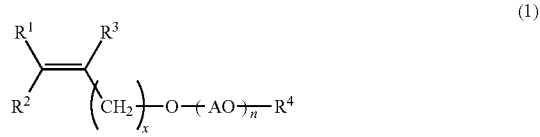

wherein $R^1$, $R^2$, and $R^3$ are the same as or different from each other and are each a hydrogen atom or a methyl group; $R^4$ is a hydrogen atom or a C1-C30 hydrocarbon group; (AO) s are the same as or different from each other and are each an oxyalkylene group; n is an average number of moles of the oxyalkylene group added and is 1 to 300; and x is 0 to 4. A preferred embodiment of the compound (X) is as described above.

(Composition)

The present invention also relates to a composition including a carboxyl group-containing polymer and a compound (X) including one molecule of a mercaptocarboxylic acid or a mercaptocarboxylic acid salt; one molecule of acrylic acid, an acrylic acid salt, or an acrylic acid ester; and one molecule of a monomer (B) represented by the formula (1), which are bonded to each other. The compound (X) is present in an amount of 0.01 to 5 mass % relative to 100 mass % of the carboxyl group-containing polymer.

When a carboxyl group-containing polymer is produced, stored, or transported using a metal article such as a container or a pipe, its carboxyl groups may cause metal corrosion of the article such as a container. Such metal corrosion of the article such as a container can be prevented when the composition containing a carboxyl group-containing polymer contains a specific amount of the compound (X). Thus, the composition of the present invention has excellent storage stability.

The compound (X) is preferably present in an amount of 0.02 to 3 mass %, more preferably 0.03 to 2 mass %, still more preferably 0.05 to 1.5 mass %.

The composition can be prepared by mixing the carboxyl group-containing polymer and the compound (X).

The concentration of the compound (X) in the composition is preferably 50 to 30000 ppm. This can lead to the composition of the present invention having much better storage stability. The concentration of the compound (X) is more preferably 100 to 20000 ppm, still more preferably 200 to 10000 ppm, particularly preferably 250 to 8000 ppm.

The composition may have any pH. The technical meaning of the present invention is particularly effectively demonstrated when the compound (X) is used in the composition having a pH of 7 or less because metal is susceptible to corrosion under acidic conditions. Meanwhile, a composition having too low a pH is unfavorable in terms of the storage stability of the carboxyl group-containing polymer. The pH of the composition is preferably 3 to 10, more preferably 4 to 9, still more preferably 5 to 7. The pH can be controlled with, for example, an alkaline substance such as an inorganic salt (e.g., a hydroxide or a carbonate of a monovalent metal or a divalent metal), ammonia, or an organic amine.

The composition may further contain a different component other than the carboxyl group-containing polymer and the compound (X).

Non-limiting examples of the different component include a residual polymerization initiator, residual monomers, by-products formed during the polymerization, and moisture. The composition may contain one or more of these.

The different component is preferably present in the composition in a proportion of 30 to 90 mass %, more preferably 40 to 80 mass % based on 100 mass % of the composition.

Although the composition desirably has a high concentration in terms of the amounts of the active components involved in corrosion inhibition or an ability to disperse cement, it desirably has a low concentration in terms of the viscosity of its solution or other factors relating to handleability.

<Carboxyl Group-Containing Polymer>

The carboxyl group-containing polymer may be any polymer containing a carboxyl group, and it preferably contains a structural unit (a) derived from an unsaturated carboxylic acid monomer (A).

The unsaturated carboxylic acid monomer (A) is suitably, for example, an unsaturated monocarboxylic acid monomer or an unsaturated dicarboxylic acid monomer. The unsaturated monocarboxylic acid monomer is any monomer containing one unsaturated group and one group capable of forming a carbanion in a molecule, and preferred examples thereof include (meth)acrylic acid, crotonic acid, tiglic acid, 3-methylcrotonic acid, and 2-methyl-2-pentenoic acid; and monovalent metal salts, divalent metal salts, ammonium salts, and organic amine salts thereof. The unsaturated dicarboxylic acid monomer is any monomer containing one unsaturated group and two groups capable of forming a carbanion in a molecule, and preferred examples thereof include maleic acid, itaconic acid, mesaconic acid, citraconic acid, and fumaric acid; monovalent metal salts, divalent metal salts, ammonium salts, and organic amine salts thereof; and anhydrides and half esters thereof.

The unsaturated carboxylic acid monomer (A) preferably includes at least one selected from the group consisting of (meth)acrylic acid, maleic acid, and salts thereof, more preferably includes at least one selected from the group consisting of (meth)acrylic acid and salts thereof, still more preferably includes at least one selected from the group consisting of acrylic acid and salts thereof.

The carboxyl group-containing polymer preferably further contains a structural unit (b) derived from the monomer (B) and/or a structural unit (c) derived from a (poly)alkylene glycol-containing monomer (C) other than the monomer (B).

In a preferred embodiment of the present invention, the carboxyl group-containing polymer contains the structural units (a) and (b) or the structural units (a) and (c).

The specific examples and preferred embodiments of the monomer (B) are as described above.

Examples of the (poly)alkylene glycol-containing monomer (C) other than the monomer (B) include compounds in which 1 to 300 mol of an alkylene oxide is added to a hydroxyalkyl vinyl ether such as hydroxybutyl vinyl ether and terminally hydrophobically-modified products thereof; (poly)alkylene glycol (meth)acrylates having a number of moles of an alkylene glycol added of 1 to 300, such as ethylene glycol (meth)acrylate and diethylene glycol (meth) acrylate; alkoxy (poly)alkylene glycol (meth)acrylates having a number of moles of an alkylene glycol added of 1 to 300, such as ethylene glycol methoxy (meth)acrylate and diethylene glycol methoxy (meth)acrylate; diesters of the above unsaturated dicarboxylic acid monomer and an alkyl (poly)alkylene glycol in which 1 to 500 mol of a C2-C18 alkylene oxide is added to a C1-C30 alcohol or amine; diesters of the above unsaturated dicarboxylic acid monomer and a C2-C18 glycol or a polyalkylene glycol having a number of moles of the glycol added of 2 to 500; (poly) alkylene glycol di(meth)acrylates such as (poly)ethylene glycol di(meth)acrylate and (poly) propylene glycol di(meth)acrylate; and (poly)alkylene glycol dimaleates such as polyethylene glycol dimaleate.

The monomer (C) is preferably a (poly)alkylene glycol (meth)acrylate having a number of moles of an alkylene glycol added of 1 to 300 or an alkoxy (poly)alkylene glycol (meth)acrylate having a number of moles of an alkylene glycol added of 1 to 300, more preferably methoxypolyethylene glycol (meth)acrylate.

The carboxyl group-containing polymer may further contain a structural unit (e) derived from a monomer (E) other than the unsaturated carboxylic acid monomer and the monomer (B).

Examples of the monomer (E) include hydroxyalkyl (meth)acrylates such as hydroxyethyl (meth)acrylate and hydroxypropyl (meth)acrylate; esters of a C1-C30 alcohol and an unsaturated monocarboxylic acid such as methyl (meth)acrylate or glycidyl (meth)acrylate; diesters of a C1-C30 alcohol and an unsaturated dicarboxylic acid such as maleic acid (anhydride), fumaric acid, or itaconic acid; diamides of the unsaturated dicarboxylic acid monomer and a C1-C30 amine; multifunctional (meth)acrylates such as hexanediol di(meth)acrylate and trimethyrolpropane tri (meth)acrylate; unsaturated sulfonic acids (and salts thereof) such as vinyl sulfonate, (meth)allyl sulfonate, 2-methylpropanesulfonic acid (meth)acrylamide, and styrene sulfonic acid; amides of a C1-C30 amine and the unsaturated monocarboxylic acid monomer, such as methyl (meth)acrylamide; vinylaromatic compounds such as styrene, α-methylstyrene, and vinyl toluene; alkanediol mono(meth)acrylates such as 1,4-butanediol mono(meth)acrylate; dienes such as butadiene and isoprene; unsaturated amides such as (meth)acryl (alkyl)amide, N-methylol (meth)acrylamide, and N,N-dimethyl (meth)acrylamide; unsaturated cyans such as (meth) acrylonitrile; unsaturated esters such as vinyl acetate; unsaturated amines such as aminoethyl (meth)acrylate, dimethylaminoethyl (meth)acrylate, and vinylpyridine; divinylaromatic compounds such as divinylbenzene; and allyls such as (meth)allyl alcohol and glycidyl (meth)allyl ether. One or more of these may be used.

The proportion of the structural unit (a) in the carboxyl group-containing polymer is preferably 1 to 80 mass % based on 100 mass % of all structural units. Such a polymer has an enhanced ability to disperse cement or the like, and is thus suitable for various applications.

The proportion of the structural unit (a) is more preferably 1.5 to 70 mass %, still more preferably 2 to 60 mass %, further preferably 2.5 to 55 mass %, furthermore preferably 2.5 to 50 mass %, particularly preferably 3 to 45 mass %, most preferably 3 to 40 mass % based on 100 mass % of all structural units.

If the structural unit (a) contains a carboxyl group in the form of a salt, the mass thereof is determined as the mass of the structural unit (a) containing a carboxyl group in the form of the corresponding acid. For example, in the case of the structure derived from sodium (meth)acrylate, the proportion of the structure is determined by calculating the mass of the structure derived from (meth)acrylic acid. Similarly, when the below-described different monomers are in the form of a salt, the mass of the monomer is determined by calculating the mass of the monomer in the corresponding acid form.

The proportion of the sum of the structural units (b) and (c) in the carboxyl group-containing polymer is preferably 20 to 99 mass % based on 100 mass % of all structural units. The proportion is more preferably 30 to 98.5 mass %, still more preferably 40 to 98 mass %, further preferably 45 to 97.5 mass %, further more preferably 50 to 97.5 mass %, particularly preferably 55 to 97 mass %, most preferably 60 to 97 mass %.

The proportion of the structural unit (e) in the carboxyl group-containing polymer is preferably 0 to 30 mass % based on 100 mass % of all structural units. The proportion is more preferably 0 to 20 mass %, still more preferably 0 to 10 mass %, particularly preferably 0 to 5 mass %, most preferably 0 mass %.

The carboxyl group-containing polymer preferably has a weight average molecular weight of 5000 to 200000, more preferably 6000 to 150000, still more preferably 7000 to 100000, particularly preferably 8000 to 50000. The weight average molecular weight of the polymer can be determined by gel permeation chromatography (GPC) under the conditions described in the EXAMPLES below.

<Method for Producing Carboxyl Group-Containing Polymer>

The carboxyl group-containing polymer may be produced by any method, and it can be produced by polymerizing a monomer component. Specific preferred examples of the monomer component include those described above. The proportion of each of the monomers (A), (B), (C), and (E) based on 100 mass % of the monomer component is the same as the proportion of each of the structural units (a), (b), (c), and (e) based on 100 mass % of all structural units described above.

In order to control the molecular weight of the polymer to be obtained, a chain transfer agent may be used. Examples of the chain transfer agent include hydrophilic chain transfer agents including thiol chain transfer agents such as mercaptoethanol, thioglycerol, mercaptocarboxylic acids, and 2-mercaptoethanesulfonic acid; secondary alcohols such as isopropyl alcohol; and lower oxides and salts thereof such as phosphorous acid, hypophosphorous acid, salts thereof (e.g., sodium hypophosphite, potassium hypophosphite), sulfurous acid, hydrogen sulfite, dithionous acid, disulfurous acid, salts thereof (e.g., sodium sulfite, sodium bisulfite, sodium dithionite, sodium metabisulfite). Preferred among these are thiol chain transfer agents.

The chain transfer agent may be a hydrophobic chain transfer agent. Suitable examples of the hydrophobic chain transfer agent include thiol chain transfer agents each containing a hydrocarbon group having three or more carbon atoms, such as butanethiol, octanethiol, decanethiol, dodecanethiol, hexadecanethiol, octadecanethiol, cyclohexyl mercaptan, thiophenol, octyl thioglycolate, and octyl 3-mercaptopropionate.

Use of a monomer with high chain transfer activity such as (meth)allylsulfonic acid (or a salt thereof) as the monomer (e) is effective to control the molecular weight of the copolymer.

The amount of the chain transfer agent used may be appropriately set, and is preferably 20 mol or less, more preferably 15 mol or less, still more preferably 10 mol or less relative to the total 100 mol of the monomer component.

The polymerization reaction may be performed by, for example, solution polymerization or bulk polymerization using a radical polymerization initiator as needed.

Specific preferred examples of the radical polymerization initiator include those described above.

The solution polymerization may be performed in a batchwise manner, a continuous manner, or by combination thereof. Examples of the solvent to be used therein include water; alcohols such as methyl alcohol, ethyl alcohol, and isopropyl alcohol; aromatic or aliphatic hydrocarbons such as benzene, toluene, xylene, cyclohexane, and n-hexane; ester compounds such as ethyl acetate; ketone compounds such as acetone and methyl ethyl ketone; and cyclic ether compounds such as tetrahydrofuran and dioxane. In particular, aqueous solution polymerization is suitable for the polymerization.

The amount of the radical polymerization initiator used is preferably 0.001 mol or more, more preferably 0.01 mol or more, still more preferably 0.1 mol or more, particularly preferably 0.2 mol or more, and preferably 20 mol or less, more preferably 10 mol or less, still more preferably 5 mol or less, particularly preferably 3 mol or less relative to the total 100 mol of the monomer component.

The polymerization conditions of the polymerization reaction, such as the polymerization temperature, are appropriately set depending on a polymerization method, a solvent, a polymerization initiator, and a chain transfer agent to be used. The polymerization temperature is preferably 0° C. or higher and 150° C. or lower. It is more preferably 30° C. or higher, still more preferably 50° C. or higher. It is more preferably 120° C. or lower, still more preferably 100° C. or lower.

The monomer component may be placed into a reaction vessel by any method such as a method of placing the entire monomer component into the reaction vessel in one portion at the beginning of the reaction; a method of placing the entire monomer component into the reaction vessel in portions or in a continuous manner; or a method of placing part of the monomer component into the reaction vessel at the beginning of the reaction, and then placing the rest of the monomer component into the reaction vessel in portions or in a continuous manner. The ratio of the weights of the monomers to each other supplied per unit time may be changed continuously or in steps by changing continuously or in steps the addition rates of the monomers to a reaction vessel in the middle of the reaction. Thereby, two or more copolymers having different monomer ratios may be simultaneously synthesized in the polymerization reaction. The radical polymerization initiator may be initially placed into the reaction vessel, may be added dropwise into the reaction vessel, or may be placed into the reaction vessel by combination of these depending on the purpose.

The thus obtained polymer may be used as it is for various applications such as dispersants. It may be neutralized with an alkaline substance as needed before use. The alkaline substance is suitably an inorganic salt (e.g., a hydroxide or a carbonate of a monovalent metal or a divalent metal), ammonia, or an organic amine. After the completion of the reaction, the concentration of the polymer may be controlled as needed.

(Method for Storing and/or Transporting Carboxyl Group-Containing Polymer)

The present invention also relates to a method for storing and/or transporting a carboxyl group-containing polymer, the method including placing a compound (X) in a container for storage and/or transport at a concentration of 50 to 30000 ppm, the compound (X) including one molecule of a mercaptocarboxylic acid or a mercaptocarboxylic acid salt; one molecule of acrylic acid, an acrylic acid salt, or an acrylic acid ester; and one molecule of a monomer (B) represented by the formula (1), which are bonded to each other.

The presence of the above concentration of the compound (X) in a container during storage and/or transport of the carboxyl group-containing polymer sufficiently suppresses metal corrosion of metal articles such as a container and a pipe. Thus, the carboxyl group-containing polymer can be stably stored and/or transported.

The concentration of the compound (X) is preferably 100 to 20000 ppm, more preferably 200 to 10000 ppm, still more preferably 250 to 8000 ppm.

The transporting herein encompasses carrying using no transport equipment or the like as well as carrying using transport equipment or the like. The carboxyl group-containing polymer during transport is simultaneously in a state of storage.

In the storing and/or transporting method, the amount of the compound (X) in the container for storage and/or transport is preferably 0.01 to 5 mass %, more preferably 0.02 to 3 mass %, still more preferably 0.03 to 2 mass %, particularly preferably 0.05 to 1.5 mass % relative to 100 mass % of the carboxyl group-containing polymer.

In the storing and/or transporting (carrying) method, the container for storage and/or transport is preferably made of metal. The technical meaning of the present invention is particularly effectively demonstrated when the container for storage and/or transport is made of metal because the compound (X) has excellent metal corrosion inhibition performance.

Examples of the metal include iron-based metals such as iron and iron alloys (e.g., iron, carbon steel, and stainless steel); copper and copper alloys such as brass and yellow copper; zinc and zinc alloys; magnesium and magnesium alloys; aluminum and aluminum alloys; nickel and nickel alloys; chromium and chromium alloys; and lead, tin, manganese, cobalt, molybdenum, tungsten, vanadium, cadmium, and alloys thereof. Preferred among these metals are iron-based metals, with iron being more preferred.

The carboxyl group-containing polymer composition in the container for storage and/or transport may have any pH. The pH is preferably 3 to 10, more preferably 4 to 9, still more preferably 5 to 7. The pH can be controlled with, for example, an alkaline substance such as an inorganic salt (e.g., a hydroxide or a carbonate of a monovalent metal or a divalent metal), ammonia, or an organic amine.

In the storing and/or transporting method, the temperature during storage and/or transport of the carboxyl group-containing polymer may be any temperature, and is preferably 0° C. to 50° C., more preferably 5° C. to 40° C., still more preferably 5° C. to 30° C. The carboxyl group-containing polymer to be stored and/or transported is expected to be in the form of an aqueous solution. Thus, the polymer is desirably handled at high temperature in terms of handleability and freezing, whereas the polymer is desirably handled at low temperature in terms of the storage stability of the polymer.

In the storing method, the storing duration may be any length of time. The duration is preferably not less than 10 hours. In this case, the effects of the present invention are markedly exhibited. The duration is more preferably not less than 1 day, still more preferably not less than 3 days, particularly preferably not less than 7 days, further preferably not less than 14 days, most preferably not less than 28 days. The storing duration is usually preferably not more than 360 days.

In the transporting method, the transporting duration may be any length of time. The duration is preferably not less than 10 hours. In this case, the effects of the present invention are markedly exhibited. The duration is more preferably not less than 1 day, still more preferably not less than 3 days, particularly preferably not less than 7 days, further preferably not less than 14 days, most preferably not less than 28 days. The transporting duration is usually preferably not more than 60 days.

The inside of the container for storage and/or transport of the carboxyl group-containing polymer may be in an air atmosphere. In order to prevent deterioration of the component and moisture absorption, it may be in an inert atmosphere. Examples of the inert gas include nitrogen and argon.

The inside of the container for storage and/or transport may have any pressure. The storage and/or transport may be performed under normal pressure (atmospheric pressure), reduced pressure, or increased pressure. Atmospheric pressure or increased pressure is preferred. In the case of storage and/or transport under normal pressure (atmospheric pressure), neither a pressure apparatus nor a pressure reducing apparatus needs to additionally be disposed, and the container or pipe for storage and/or transport does not need to be pressure-resistant. Thus, normal pressure (atmospheric pressure) is preferred in terms of cost.

In the storing and/or transporting method, the carboxyl group-containing polymer may be any polymer containing a carboxyl group, and is preferably the same as the carboxyl group-containing polymer in the composition of the present invention.

Hereinafter, the present invention will be described in more detail based on the examples which, however, are not intended to limit the scope of the present invention. Here, "part (s)" refers to "part (s) by mass" and "%" refers to "mass %", unless otherwise specified.

The following describes the measurements conducted in the EXAMPLES.

<GPC Analysis Conditions>

Columns used: TSK guard column SWXL, TSKgel G4000SWXL, TSKgel G3000SWXL, and TSKgel G2000SWXL, all available from Tosoh Corporation, were connected in series Eluent: A solution prepared by dissolving 115.6 g of sodium acetate trihydrate in a solvent mixture containing 10999 g of water and 6001 g of acetonitrile and controlling the pH of the solution to 6.0 with acetic acid Injected amount: 100 µL of a 0.5% eluent solution Eluent flow rate: 1.0 mL/min Column temperature: 40° C.

Reference material: Polyethylene glycol, peak top molecular weights (Mp): 255000, 200000, 107000, 72750, 44900, 31440, 21300, 11840, 6450, 4020, 1470

Calibration curve order: Cubic curve

Detector: 410 Differential refractive index detector available from Nihon Waters Analysis software: MILLENNIUM Ver. 3.21 available from Nihon Waters <HPLC Analysis Conditions>

Columns used: Atlantis dC18 (5 µm, 4.6×20 mm) guard column available from Waters and two Atlantis dC18 (5 µm, 4.6×250 mm) columns available from Waters were connected in series Eluent: A solution prepared by dissolving 4.5 g of sodium acetate trihydrate and 63 g of acetic acid in a solvent mixture containing 10800 g of water and 7200 g of acetonitrile Injected amount: 100 µL of a 1.0% eluent solution Eluent flow rate: 1.0 mL/min Column temperature: 40° C.

Detector: 410 Differential refractive index detector available from Nihon Waters Analysis software: MILLENNIUM Ver. 3.21 available from Nihon Waters <LC-MS Analysis Conditions>

Apparatus: LTQ-XL (MS), Ultimate 3000 (LC) available from Thermo Fisher Scientific K.K.

Columns used: Two Atlantis dC18 columns (5 µm, 4.6×250 mm) available from Waters connected in series Eluent: A solution mixture of a solution A which is a solution containing a 2 mM ammonium acetate solution and acetonitrile at a ratio of 2 mM ammonium acetate solution/acetonitrile=4/6 and a solution B which is a 1% aqueous solution of acetic acid, at a ratio of A/B=99/1

Ionization method: ESI method, detection of positive or negative ions

Range of detection: M/z=50 to 2000

Eluent flow rate: 1 mL/min (Split 1/5)

Column temperature: 40° C.

Injection: 20 uL, automatic sample injection

<Steel Plate Corrosion Test>

A test piece (rolled steel plate with a hole, length: 50 mm×width: 25 mm×thickness: 1.6 mm, SS400) was hung with Teflon® strands so that the test piece was completely immersed in a test solution in a glass container and allowed to stand at 40° C. After a predetermined number of days, the weight of the steel plate was measured and the weight change from the initial weight was recorded. Thus, the percentage of the reduction in the weight of the steel plate was determined.

<Measurement Method of Solid Content>

1. An aluminum plate was precisely weighed.
2. A solid content measurement target was placed on the aluminum plate that was precisely weighed in Step 1, and precisely weighed.
3. The solid content measurement target that was precisely weighed in Step 2 was placed for one hour in a dryer whose temperature had been controlled to 130° C. in a nitrogen atmosphere.
4. After one hour, the solid content measurement target was taken out from the dryer and cooled in a desiccator at room temperature for 15 minutes.
5. After 15 minutes, the solid content measurement target was taken out from the desiccator, and the sum of the masses of the aluminum plate and the solid content measurement target was precisely determined.
6. The mass of the aluminum plate determined in Step 1 was subtracted from the mass determined in Step 5, and the resulting value was divided by the mass of the solid content measurement target determined in Step 2 to give the solid content.

(Example 1): Production of Corrosion Inhibiting Oligomer (1)

In a glass reaction vessel, 19.2 parts of ion exchange water, 1.08 parts of mercaptopropionic acid, 0.73 parts of acrylic acid, and 29.0 parts of a 80% aqueous solution of a product in which ethylene oxide was added (average number of moles of ethylene oxide added: 50) to the hydroxy groups of 3-methyl-3-buten-1-ol (isoprenol) (hereinafter, referred to as IPN-50) were mixed. They were reacted at room temperature for eight hours in a nitrogen atmosphere under stirring at 200 rpm. Thus, a target corrosion inhibiting oligomer (1) was obtained in a yield of 31% based on the reacted raw materials (13% based on all raw materials including unreacted materials, identification was performed by LC-MS measurement, and the yield was determined from the area ratio in an analysis chart obtained with a HPLC apparatus equipped with a differential refractive index detector.

(Production Example 1): Production of Carboxyl Group-Containing Polymer

A glass reaction vessel equipped with a Dimroth condenser, a stirrer equipped with a stirring blade made of Teflon® and a stirring seal, a nitrogen inlet tube, and a temperature sensor was charged with 197.4 parts of a 80% aqueous solution of IPN-50 and 49.4 parts of ion exchange water. Under stirring at 250 rpm, the contents were warmed to 65° C. while nitrogen was introduced at 200 mL/min thereinto. Then, a solution mixture of 7.0 parts of acrylic acid and 7.0 parts of ion exchange water was added dropwise to the vessel over five hours. Simultaneously, a solution mixture of 0.20 parts of L-ascorbic acid and 21.9 parts of ion exchange water and an aqueous solution of 0.68 parts of ammonium persulfate and 16.3 parts of ion exchange water were added dropwise over five and a half hours. After completion of the dropwise addition, the temperature was maintained at 65° C. for one hour. Thereby, the polymerization reaction was completed. The obtained reaction product was diluted and neutralized with ion exchange water and an aqueous sodium hydroxide solution so that the solid content as determined by the above measurement method and pH were respectively controlled to 50% and 5.5. Thus, an aqueous solution of a copolymer (2) having a weight average molecular weight of 40000 was obtained.

(Examples 2 to 5 and Comparative Examples 1 to 4): Steel Plate Corrosion Test

Test solutions were each prepared by mixing the aqueous solution of the copolymer (2) and an aqueous solution of the oligomer (1) or an aqueous solution of IPN-50 according to Table 1 below, and subjected to the corrosion test by the method described above. The results are shown in Table 1. The concentration of the oligomer in the test solution was determined by the following formula (4).

$$\{(\text{Amount of aqueous solution of oligomer added}) \times (\text{concentration of oligomer in aqueous solution of oligomer})\}/\{(\text{amount of aqueous solution of carboxyl group-containing copolymer added}) + (\text{amount of aqueous solution of oligomer added})\} \quad (4)$$

The concentration of the oligomer in the aqueous solution of the oligomer in the formula (4) was determined by the following formula (5).

$$(\text{All raw materials for synthesis of oligomer, excluding water})/(\text{all raw materials for synthesis of oligomer, including water}) \times (\text{yield of oligomer relative to all raw materials}) \quad (5)$$

The yield of the oligomer in the formula (5) was determined from the ratio of the area of the oligomer peak to the sum of the areas of all peaks in the analysis chart obtained with a differential refractive index detector by HPLC.

Analyses by LC-MS and by HPLC were performed using the same column. Thus, the components eluted in the same order in LC-MS and HPLC, and the order of appearance of the peaks of the components was the same in the analysis charts of LC-MS and HPLC. Accordingly, the oligomer peak can be identified in the analysis chart obtained with a differential refractive index detector by HPLC based on the oligomer peak identified by LC-MS.

TABLE 1

| | Composition of test solution (g) | | | Concentration of oligomer in test solution (ppm) | Reduction in weight of steel plate (14 days) | Reduction in weight of steel plate (28 days) |
|---|---|---|---|---|---|---|
| | Aqueous solution of copolymer (2) | Aqueous solution of corrosion inhibiting oligomer (1) | IPN-50 | | | |
| Example 2 | 75 | 0.18 | — | 160 | 0.21% | 0.39% |
| Example 3 | 75 | 2.5 | — | 2100 | 0.15% | 0.26% |
| Example 4 | 75 | 12.5 | — | 9300 | 0.19% | 0.33% |
| Example 5 | 75 | 45 | — | 24000 | 0.27% | 0.49% |
| Comparative Example 1 | 75 | — | — | — | 0.52% | 0.92% |
| Comparative Example 2 | 75 | — | 2.5 | — | 0.55% | 0.93% |
| Comparative Example 3 | 75 | — | 12.5 | — | 0.61% | 1.06% |
| Comparative Example 4 | 75 | — | 45 | — | 0.39% | 0.69% |

The results shown in Table 1 demonstrate that addition of a certain amount or more of the corrosion inhibiting oligomer (1) can significantly reduce the reduction in the weight of the steel plate. They further demonstrate that the corrosion inhibition rate compared to the case of addition of no oligomer can be kept in the 28-day test similarly in that in the 14-day test.

(Example 6): Production of Corrosion Inhibiting Oligomer (3)

In a glass reaction vessel, 40.0 parts of ion exchange water, 0.91 parts of mercaptopropionic acid, 0.62 parts of acrylic acid, and 38.5 parts of a product in which ethylene oxide was added (average number of moles of ethylene oxide added: 100) to the hydroxy groups of 2-methyl-allyl alcohol were mixed. They were reacted at room temperature for six hours in a nitrogen atmosphere under stirring at 200 rpm. Thus, a target corrosion inhibiting oligomer (3) was obtained in a yield of 55% (31% based on all raw materials including unreacted materials, identification was performed by LC-MS measurement, and the yield was determined from the area ratio, excluding unreacted 2-methyl-allyl alcohol with ethylene oxide added, in an analysis chart obtained with a differential refractive index detector by HPLC).

(Production Example 2): Production of Carboxyl Group-Containing Polymer (4)

A glass reaction vessel equipped with a Dimroth condenser, a stirrer equipped with a stirring blade made of Teflon® and a stirring seal, a nitrogen inlet tube, and a temperature sensor was charged with 268.6 parts of a product in which ethylene oxide was added (average number of moles of ethylene oxide added: 100) to the hydroxy groups of 2-methyl-allyl alcohol and 151.1 parts of ion exchange water. Under stirring at 250 rpm, the contents were heated to 65° C. while nitrogen was introduced at 200 mL/min thereto. Then, a solution mixture of 6.4 parts of acrylic acid and 6.4 parts of ion exchange water was added dropwise to the vessel over six hours. Simultaneously, a solution mixture of 0.17 parts of L-ascorbic acid and 52.3 parts of ion exchange water and an aqueous solution of 0.60 parts of ammonium persulfate and 14.5 parts of ion exchange water were added dropwise over six and a half hours. After completion of the dropwise addition, the temperature was maintained at 65° C. for one hour. Thereby, the polymerization reaction was completed. Thus, an aqueous solution of a copolymer (4) having a mass average molecular weight of 60000 was obtained.

(Examples 7 to 9 and Comparative Example 5): Steel Plate Corrosion Test

Test solutions were each prepared by mixing an aqueous solution of the copolymer (4) having a solid content of 45 mass % and a pH of 5.5 and the corrosion inhibiting oligomer (3) according to Table 2 below, and subjected to the corrosion test by the method described above. The results are shown in Table 2.

TABLE 2

| | Composition of test solution (g) | | Concentration of oligomer in test solution (ppm) | Reduction in weight of steel plate (14 days) | Reduction in weight of steel plate (28 days) |
|---|---|---|---|---|---|
| | Aqueous solution of copolymer (4) | Aqueous solution of corrosion inhibiting oligomer (3) | | | |
| Example 7 | 75 | 0.2 | 410 | 0.13% | 0.22% |
| Example 8 | 75 | 1.0 | 2040 | 0.09% | 0.17% |
| Example 9 | 75 | 2.5 | 5000 | 0.11% | 0.21% |
| Comparative Example 5 | 75 | — | — | 0.67% | 1.12% |

The results shown in Table 2 demonstrate that addition of a certain amount or more of the corrosion inhibiting oligomer (3) can significantly reduce the reduction in the weight of the steel plate. They further demonstrate that the corrosion inhibition rate in the 28-day test, compared to that in the case of addition of no oligomer, can be similarly kept to that in the 14-day test.

(Production Example 3): Production of Carboxyl Group-Containing Polymer (5)

A glass reaction vessel equipped with a Dimroth condenser, a stirrer equipped with a stirring blade made of Teflon® and a stirring seal, a nitrogen inlet tube, and a temperature sensor was charged with 105.0 parts of ion exchange water. Under stirring at 250 rpm, the content was heated to 80° C. while nitrogen was introduced at 200 mL/min. Then, a solution mixture of 99.9 parts of methoxy-polyethylene glycol monomethacrylic acid ester (average number of moles of ethylene oxide added: 23), 19.9 parts of methacrylic acid, 1.5 parts of a 30% aqueous solution of sodium hydroxide, and 19.9 parts of ion exchange water was added dropwise over four hours. Simultaneously, a solution mixture of 0.66 parts of ammonium persulfate and 53.2 parts of ion exchange water was added dropwise over five hours. After completion of the dropwise addition, the temperature was maintained at 80° C. for one hour. Thereby, the polymerization reaction was completed. The obtained reaction product was neutralized with an aqueous solution of sodium hydroxide. Thus, an aqueous solution of a copolymer (copolymer (5)) having a weight average molecular weight of 70000 was obtained.

(Examples 10 to 13 and Comparative Example 6): Steel Plate Corrosion Test

Test solutions were each prepared by mixing an aqueous solution of the copolymer (5) having a solid content of 45 mass % and a pH of 5.5 and the corrosion inhibiting oligomer (1) or (3) according to Table 3 below, and subjected to the corrosion test by the method described above. The results are shown in Table 3.

TABLE 3

| | Composition of test solution (g) | | | Concentration of oligomer in test solution (ppm) | Reduction in weight of steel plate (14 days) |
| --- | --- | --- | --- | --- | --- |
| | Aqueous solution of copolymer (5) | Aqueous solution of corrosion inhibiting oligomer (1) | Aqueous solution of corrosion inhibiting oligomer (3) | | |
| Example 10 | 75 | 2.5 | — | 2100 | 0.12% |
| Example 11 | 75 | 5.0 | — | 4060 | 0.13% |
| Example 12 | 75 | — | 1.0 | 2039 | 0.17% |
| Example 13 | 75 | — | 2.0 | 4030 | 0.19% |
| Comparative Example 6 | 75 | — | — | — | 0.63% |

The results in Table 3 demonstrate that addition of a certain amount or more of the corrosion inhibiting oligomer (1) or (3) can significantly reduce the reduction in the weight of the steel plate weight.

The invention claimed is:

1. A metal corrosion inhibitor comprising:
a compound (X),
represented by the following formula (2):

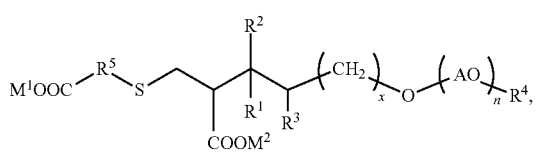

(2)

wherein $R^1$, $R^2$, and $R^3$ are the same as or different from each other and are each a hydrogen atom or a methyl group; $R^4$ is a hydrogen atom or a C1-C30 hydrocarbon group; AOs are the same as or different from each other and are each an oxyalkylene group; n is an average number of moles of the oxyalkylene group added and is 1 to 300; x is 0 to 4; $R^5$ is a C1-C4 divalent hydrocarbon group; $M^1$ is a hydrogen atom, a metal atom, an ammonium group, a quaternary ammonium group, or an organic amine group; $M^2$ is a hydrogen atom, a metal atom, an ammonium group, a quaternary ammonium group, an organic amine group, or a C1-C30 hydrocarbon group.

2. The metal corrosion inhibitor according to claim 1, wherein the compound (X) is a compound obtained by reacting an addition reaction product of compound (B) represented by the following formula (1) and acrylic acid, an acrylic acid salt, or an acrylic acid ester with the thiol group of a mercaptocarboxylic acid or a mercaptocarboxylic acid salt:

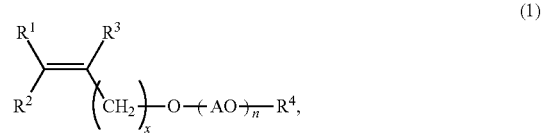

(1)

wherein $R^1$, $R^2$, and $R^3$ are the same as or different from each other and are each a hydrogen atom or a methyl group; $R^4$ is a hydrogen atom or a C1-C30 hydrocarbon group; AOs are the same as or different from each other and are each an oxyalkylene group; n is an average number of moles of the oxyalkylene group added and is 1 to 300; and x is 0 to 4.

3. A composition comprising:
a carboxyl group-containing polymer; and
a compound (X),
wherein the compound (X) is represented by the following formula (2):

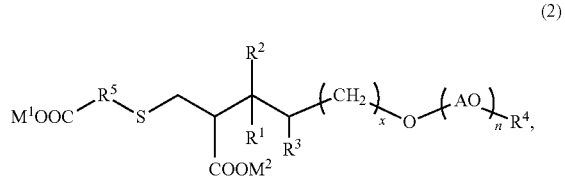

(2)

wherein $R^1$, $R^2$, and $R^3$ are the same as or different from each other and are each a hydrogen atom or a methyl group; $R^4$ is a hydrogen atom or a C1-C30 hydrocarbon group; AOs are the same as or different from each other and are each an oxyalkylene group; n is an average number of moles of the oxyalkylene group added and is 1 to 300; x is 0 to 4; $R^5$ is a C1-C4 divalent hydrocarbon group; $M^1$ is a hydrogen atom, a metal atom, an ammonium group, a quaternary ammonium group, or an organic amine group; $M^2$ is a hydrogen atom, a metal atom, an ammonium group, a quaternary ammonium group, an organic amine group, or a C1-C30 hydrocarbon group, and the compound (X) is present in an amount of from 0.01 to 5 mass % relative to 100 mass % of the carboxyl group-containing polymer.

4. The composition according to claim 3,
wherein the compound (X) is present in an amount of 1.5 to 5 mass % relative to 100 mass % of the carboxyl group-containing polymer.

5. The composition according to claim 3, wherein the compound (X) is a compound obtained by reacting an addition reaction product of compound (B) represented by the following formula (1) and acrylic acid, an acrylic acid salt, or an acrylic acid ester with the thiol group of a mercaptocarboxylic acid or a mercaptocarboxylic acid salt:

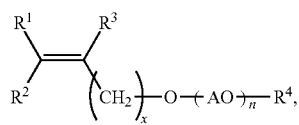
(1)

wherein $R^1$, $R^2$, and $R^3$ are the same as or different from each other and are each a hydrogen atom or a methyl group; $R^4$ is a hydrogen atom or a C1-C30 hydrocarbon group; AOs are the same as or different from each other and are each an oxyalkylene group; n is an average number of moles of the oxyalkylene group added and is 1 to 300; and x is 0 to 4.

6. A method for storing and/or transporting a carboxyl group-containing polymer, the method comprising:
mixing a compound (X) with the carboxyl group-containing polymer so that a concentration of the compound (X) is 50 to 30000 ppm; and
placing the mixture of the carboxyl group-containing polymer and the compound (X) in a container for storing and/or transporting,
wherein the compound (X) is a compound represented by the following formula (2):

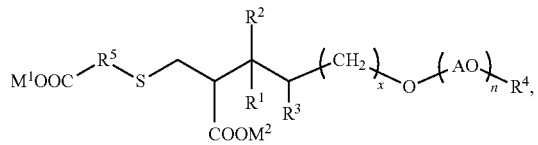
(2)

wherein $R^1$, $R^2$, and $R^3$ are the same as or different from each other and are each a hydrogen atom or a methyl group; $R^4$ is a hydrogen atom or a C1-C30 hydrocarbon group; AOs are the same as or different from each other and are each an oxyalkylene group; n is an average number of moles of the oxyalkylene group added and is 1 to 300; x is 0 to 4; $R^5$ is a C1-C4 divalent hydrocarbon group; $M^1$ is a hydrogen atom, a metal atom, an ammonium group, a quaternary ammonium group, or an organic amine group; $M^2$ is a hydrogen atom, a metal atom, an ammonium group, a quaternary ammonium group, an organic amine group, or a C1-C30 hydrocarbon group.

7. The method for storing and/or transporting a carboxyl group-containing polymer according to claim 6,
wherein the concentration of the compound (X) is 8000 to 30000 ppm.

8. The method according to claim 6, wherein the compound (X) is a compound obtained by reacting an addition reaction product of compound (B) represented by the following formula (1) and acrylic acid, an acrylic acid salt, or an acrylic acid ester with the thiol group of a mercaptocarboxylic acid or a mercaptocarboxylic acid salt:

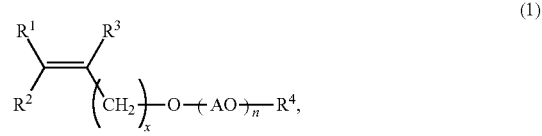
(1)

wherein $R^1$, $R^2$, and $R^3$ are the same as or different from each other and are each a hydrogen atom or a methyl group; $R^4$ is a hydrogen atom or a C1-C30 hydrocarbon group; AOs are the same as or different from each other and are each an oxyalkylene group; n is an average number of moles of the oxyalkylene group added and is 1 to 300; and x is 0 to 4.

9. A method for inhibiting corrosion of a metal article by a carboxyl group-containing polymer, comprising:
exposing the metal article to a composition including the carboxyl group-containing polymer,
wherein the composition further comprises a compound (X) as a corrosion inhibitor,
wherein the compound (X) is a compound represented by the following formula (2):

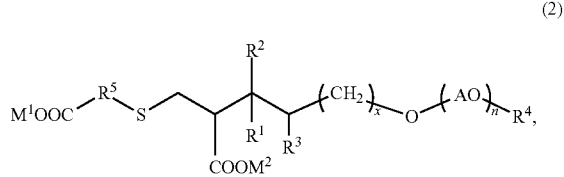
(2)

wherein $R^1$, $R^2$, and $R^3$ are the same as or different from each other and are each a hydrogen atom or a methyl group; $R^4$ is a hydrogen atom or a C1-C30 hydrocarbon group; AOs are the same as or different from each other and are each an oxyalkylene group; n is an average number of moles of the oxyalkylene group added and is 1 to 300; x is 0 to 4; $R^5$ is a C1-C4 divalent hydrocarbon group; $M^1$ is a hydrogen atom, a metal atom, an ammonium group, a quaternary ammonium group, or an organic amine group; $M^2$ is a hydrogen atom, a metal atom, an ammonium group, a quaternary ammonium group, an organic amine group, or a C1-C30 hydrocarbon group.

10. The method according to claim 9, wherein the compound (X) is a compound obtained by reacting an addition reaction product of compound (B) represented by the following formula (1) and acrylic acid, an acrylic acid salt, or an acrylic acid ester with the thiol group of a mercaptocarboxylic acid or a mercaptocarboxylic acid salt:

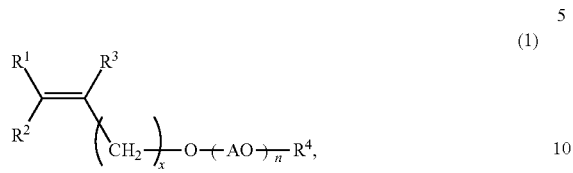

(1)

wherein $R^1$, $R^2$, and $R^3$ are the same as or different from each other and are each a hydrogen atom or a methyl group; $R^4$ is a hydrogen atom or a C1-C30 hydrocarbon group; AOs are the same as or different from each other and are each an oxyalkylene group; n is an average number of moles of the oxyalkylene group added and is 1 to 300; and x is 0 to 4.

* * * * *